United States Patent
Pawar et al.

(10) Patent No.: US 10,856,182 B1
(45) Date of Patent: Dec. 1, 2020

(54) CONTROLLING VOICE-OVER-PACKET SERVICE WHERE BASE STATIONS PROVIDE OVERLAPPING COVERAGE ON OVERLAPPING RF CARRIERS

(71) Applicant: Sprint Spectrum L.P., Overland Park, KS (US)

(72) Inventors: Hemanth B. Pawar, Brambleton, VA (US); Krishna Sitaram, Chantilly, VA (US); Shilpa K. Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 17 days.

(21) Appl. No.: 16/248,049

(22) Filed: Jan. 15, 2019

(51) Int. Cl.
*H04W 28/18* (2009.01)

(52) U.S. Cl.
CPC .................. *H04W 28/18* (2013.01)

(58) Field of Classification Search
None
See application file for complete search history.

(56) References Cited

U.S. PATENT DOCUMENTS

| | | | |
|---|---|---|---|
| 2014/0348064 A1* | 11/2014 | Jeong | H04W 36/0022 370/328 |
| 2015/0092708 A1* | 4/2015 | Su | H04W 76/16 370/329 |
| 2015/0327129 A1* | 11/2015 | Faccin | H04W 36/0055 370/331 |
| 2016/0073297 A1* | 3/2016 | Hwang | H04W 36/0011 370/331 |
| 2016/0278096 A1* | 9/2016 | Watfa | H04W 28/12 |
| 2016/0344572 A1* | 11/2016 | Brust | H04L 12/66 |
| 2019/0021037 A1* | 1/2019 | Shaw | H04W 36/36 |
| 2019/0124559 A1* | 4/2019 | Brown | H04W 36/0085 |
| 2019/0313326 A1* | 10/2019 | Takeda | H04W 48/10 |
| 2019/0342888 A1* | 11/2019 | Hosseini | H04W 72/005 |
| 2019/0364464 A1* | 11/2019 | Shaikh | H04L 12/1407 |
| 2020/0037223 A1* | 1/2020 | Cao | H04W 48/18 |
| 2020/0092752 A1* | 3/2020 | Henry | H04W 28/10 |

* cited by examiner

*Primary Examiner* — Donald L Mills

(57) ABSTRACT

Given first and second base stations that have at least partially geographically-overlapping coverage on at least partially frequency-overlapping carriers, a determination could be made that the first base station supports voice-interworking service in which served UEs could separately receive voice-over-circuit service but that the second base station does not support voice-interworking service. And in response to at least that determination, the second base station could be given priority over the first base station for providing voice-over-packet service.

20 Claims, 4 Drawing Sheets

52 — IN A SYSTEM THAT INCLUDES A FIRST BASE STATION THAT PROVIDES FIRST COVERAGE ON A FIRST RF CARRIER AND A SECOND BASE STATION THAT PROVIDES SECOND COVERAGE ON A SECOND RF CARRIER, THE FIRST AND SECOND RF CARRIERS AT LEAST PARTIALLY OVERLAPPING WITH EACH OTHER IN FREQUENCY TO DEFINE AN OVERLAPPING FREQUENCY REGION, THE FIRST COVERAGE AT LEAST PARTIALLY GEOGRAPHICALLY OVERLAPPING WITH THE SECOND COVERAGE, AND THE FIRST AND SECOND BASE STATIONS EACH SUPPORTING PROVIDING OF VOICE-OVER-PACKET SERVICE, DETERMINE (I) THAT THE FIRST BASE STATION AND SECOND BASE STATION HAVE THRESHOLD HEAVING LOADING AND (II) THAT THE FIRST BASE STATION SUPPORTS PROVIDING VOICE-INTERWORKING SERVICE INCLUDING PROVIDING WIRELESS PACKET-DATA SERVICE TO UEs WHILE THE UEs SEPARATELY RECEIVE VOICE-OVER-CIRCUIT SERVICE, BUT THAT THE SECOND BASE STATION DOES NOT SUPPORT PROVIDING THE VOICE-INTERWORKING SERVICE

54 — RESPONSIVE TO THE DETERMINING, CONFIGURE THE FIRST AND SECOND BASE STATIONS TO GIVE THE SECOND BASE STATION PRIORITY OVER THE FIRST BASE STATION FOR USE OF AT LEAST THE OVERLAPPING FREQUENCY REGION TO PROVIDE THE VOICE-OVER-PACKET SERVICE

Fig. 4

CONTROLLING VOICE-OVER-PACKET SERVICE WHERE BASE STATIONS PROVIDE OVERLAPPING COVERAGE ON OVERLAPPING RF CARRIERS

BACKGROUND

A cellular wireless network typically includes a number of base stations, that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each base station could be coupled with a core network that provides connectivity with various application servers and/or transport networks, such as the public switched telephone network (PSTN) and/or the Internet for instance. With this arrangement, a UE within coverage of the cellular network could engage in air interface communication with a base station and could thereby communicate via the base station with various application servers and other entities.

Such a network could operate in accordance with a particular radio access technology (RAT), with communications from the base stations to UEs defining a downlink or forward link and communications from the UEs to the base stations defining an uplink or reverse link.

In accordance with a given RAT, each coverage area could define an air interface operating on a respective radio-frequency (RF) carrier, which could be frequency division duplex (FDD), defining separate frequency channels for downlink and uplink communication, or time division duplex (TDD), with a single frequency channel multiplexed over time between downlink and uplink use. Further, on the downlink and uplink of each such carrier, the air interface could be structured to define various logical or physical channels for carrying information between the base stations and UEs.

Over the years, the industry has embraced various "generations" of RATs, in a continuous effort to increase available data rate and quality of service for end users. These generations have ranged from "1G," which used simple analog frequency modulation to facilitate basic voice-call service, to "2G" or "3G," such as Code Division Multiple Access (CDMA), which used spread spectrum coding to facilitate voice-over-circuit service, to "4G"—such as Long Term Evolution (LTE), which facilitates mobile broadband service and voice-over-packet service, using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

OVERVIEW

As the industry advances from one generation of RAT to another, a cellular network provider may implement multiple different RATs concurrently in a given geographic location, to support both legacy UEs and more advanced UEs.

At a given cell site, for instance, a provider may operate both a 3G CDMA base station to provide UEs with voice-over-circuit service and a 4G LTE base station to provide UEs with broadband packet-data service. Further, the provider may then add to the cell site a 5G NR base station to provide UEs with improved packet-data service as discussed above.

Such collocated base stations may provide geographically overlapping coverage. For instance, the base stations might share a common and/or collocated antenna tower or other antenna structure and might be configured to provide radiation patterns having largely the same antenna beam direction and beam width as each other. With this arrangement, a UE could thus operate within coverage all three base stations concurrently and, depending on capabilities, may have access to the multiple RATs.

Further, there could be instances where collocated base stations that provide geographically overlapping coverage also operate on RF carriers that at least partially overlap with each other in frequency. For instance, a given cell site might include both a 4G base station operating on a 4G carrier and a 5G base station operating on a 5G carrier, and the 4G and 5G carriers might at least partially overlap in frequency, thus having a common (overlapping) frequency range or region.

A cellular provider might configure collocated base stations to operate on overlapping RF carriers if the cellular provider has a limited quantity of licensed RF spectrum for distribution among the base stations. For example, the provider might have a license for a 100-MHz-wide block of RF spectrum and may operate a 4G base station configured to use 20 MHz of that licensed spectrum as a 4G carrier, and the provider may then configure a collocated 5G base station to operate on the full 100 MHz of licensed spectrum, resulting in a frequency overlap of 20 MHz. And as another example, the provider might have a license for a 7-MHz-wide block of RF spectrum and may configure one base station to operate on the lower 5 MHz carrier of that licensed spectrum and a collocated base station to operate on the higher 5 MHz of the licensed spectrum, resulting in an overlap of 2 MHz. Other examples are possible as well.

There could also be situations where non-collocated base stations provide at least partially geographically-overlapping coverage on at least partially frequency-overlapping carriers. For instance, a 4G base station at one cell site might provide 4G coverage on a 20-MHz 4G carrier, and a 5G base station at a neighboring cell site might provide 5G coverage on a 100-MHz 5G carrier that overlaps in frequency with that 20-MHz 4G carrier as in the example above.

Regardless of whether the base stations are collocated with each other, if the base stations provide at least partially geographically-overlapping coverage on at least partially frequency-overlapping carriers, the base stations could be configured to coordinate their use of the overlapping frequency range in an effort to avoid interference between their respective communications. For instance, the base stations could regularly engage in signaling with each other to share information about when they plan to communicate in the overlapping frequency range, and the base stations could use that information to help avoid communicating concurrently on the same RF frequency as each other in their geographically overlapping coverage area.

Coordinating use of the base stations' overlapping frequency range may be important especially at times when the base stations are heavily loaded with communication traffic and when the base stations could thus each benefit from use of the overlapping frequency range. Namely, each base station's carrier defines a limited extent of air interface resources (e.g., subcarriers per unit time). If the base stations are lightly loaded with communication traffic, then they may not need to use the resources in the overlapping frequency range. But if they are heavily loaded with communication traffic, then they may face contention for use of the overlapping frequency range.

One way to help manage this resource limitation is to dynamically control the extent of communication traffic that either or each base station respectively serves. For instance, if one base station could be restricted from serving certain communications, then the other base station may have more liberal use of the overlapping frequency range without as much risk of resource contention.

The present disclosure provides for dynamically controlling communication service in such a scenario, based on a consideration of whether the base stations respectively support offloading of voice-call traffic. In particular, the disclosure addresses a scenario where the base stations at issue each support providing packet-data service including voice-over-packet service and where one of the base stations also supports providing voice-interworking service in which it serves UEs with packet-data service while the UEs separately receive voice-over-circuit service, but the other base station does not support providing such voice-interworking service. In that scenario, the base station that supports voice-interworking service could be made to forgo providing some or all voice-over-packet service, as its served UEs could instead separately receive voice-over-circuit service.

Phrased another way, as between a first base station that supports voice-interworking service and a second base station that does not support voice-interworking service, the second base station could be given priority over the first base station for providing voice-over-packet service. Thus, while both base stations support providing voice-over-packet service, the base station that does not support voice-interworking service could provide voice-over-packet service while the base station that supports voice-interworking service could forgo providing voice-over-packet service, as its served UEs may instead receive voice-over-circuit service.

The voice-interworking service at issue here could take various forms. Without limitation, examples include Single Radio LTE (SRLTE) service and Circuit Switched Fallback (CSFB) service offered by some 4G base stations.

With SRLTE, a UE that is connected with a 4G base station and is registered to be provided with 4G packet-data service is also concurrently registered with and thus served by 3G base station for receiving voice-over-circuit service. The UE then normally operates on its 4G connection but periodically tunes away from 4G to 3G to check for voice call page messages during predefined paging time slots, and the UE could tune away from 4G to 3G when desired from to place a voice call. Through signaling between the UE and its serving 4G base station, the 4G base station that supports SRLTE would be aware of the fact that the UE is operating with SRLTE, and the 4G base station could therefore avoid communicating with the UE during instances when the UE is tuned away to 3G.

With CSFB, a UE that is connected with a 4G base station and is registered to be provided with 4G packet-data service is likewise also concurrently registered with a 3G network, but the UE is so registered through the UE's 4G connection and through an interworking service between the 4G and 3G networks. With this arrangement, voice-call origination signaling and paging would pass between the UE and the 3G network via the interworking service, the 4G network, and the air interface between the 4G base station and the UE. And once such a call is set up, the UE would tune away from 4G to 3G to engage in the call.

While 4G base stations may be programmed to support these or other forms of voice-interworking service to enable their served UEs to receive voice-over-circuit service as an alternative to voice-over-packet service, 5G base stations will probably not be programmed to support voice-interworking service and may therefore be restricted to providing voice-over-packet service. The present disclosure provides for leveraging such a distinction as a basis to control which base station will have priority for providing voice-over-packet service. Namely, while both base stations support providing voice-over-packet service, the 5G base station could be given priority over the 4G base station for providing voice-over-packet service in a scenario where the 4G base station supports voice-interworking service but the 5G base station does not.

Accordingly, given first and second base stations that have at least partially geographically-overlapping coverage on at least partially frequency-overlapping carriers, a determination could be made that the first base station supports voice-interworking service but that the second base station does not support voice-interworking service. And in response to at least that determination, the second base station could be given priority over the first base station for providing voice-over-packet service.

Because the first base station supports voice-interworking service as an alternative to providing voice-over-packet service, the first base station is given lower priority for providing voice-over-packet service. And because the second base station does not support voice-interworking service as an alternative to providing voice-over-packet service, the second base station is given higher priority for providing voice-over-packet service. Further, this voice-call prioritization could be carried out in response to detecting that the base stations have threshold heavy loading of communication traffic, such that they may face contention for use of their overlapping frequency range.

The base stations could be provisioned with this voice-call prioritization logic at the time either or each base station is put in service. For instance, if a cell site has a 3G base station and 4G base station and the cellular provider adds to the cell site a 5G base station, the 4G base station and/or 5G base station could then be programmed to implement this voice-call prioritization when appropriate. This programming of the base station(s) could be automated by a configuration server (e.g., a Self-Organization-Network (SON) server), which could be a centralized server and/or provided as part of one or both of the base stations. Alternatively, part or all of the process could be carried out manually.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

BRIEF DESCRIPTION OF THE DRAWINGS

FIG. 4 is another flow chart depicting an example method in accordance with the disclosure.

DETAILED DESCRIPTION

An example implementation will now be described in the context of a system including a 4G LTE base station (evolved Node-B (eNB)) and a 5G NR base station (gigabit Node-B (gNB)) that provide at least partially geographically-overlapping coverage on at least partially frequency-overlapping RF carriers as discussed above, where the 4G eNB and 5G gNB both support providing packet-data service including voice-over-packet service, and where the 4G eNB supports providing voice-interworking service but where the 5G gNB does not support providing voice-interworking service.

However, it should be understood that the principles disclosed herein could extend to apply with respect to other scenarios as well, such as with respect to other RATs and configurations. Further, it should be understood that other variations from the specific arrangements and processes described are possible. For instance, various described entities, connections, operations, and other features could be added, omitted, distributed, re-located, re-ordered, combined, or changed in other ways.

Figure 1:
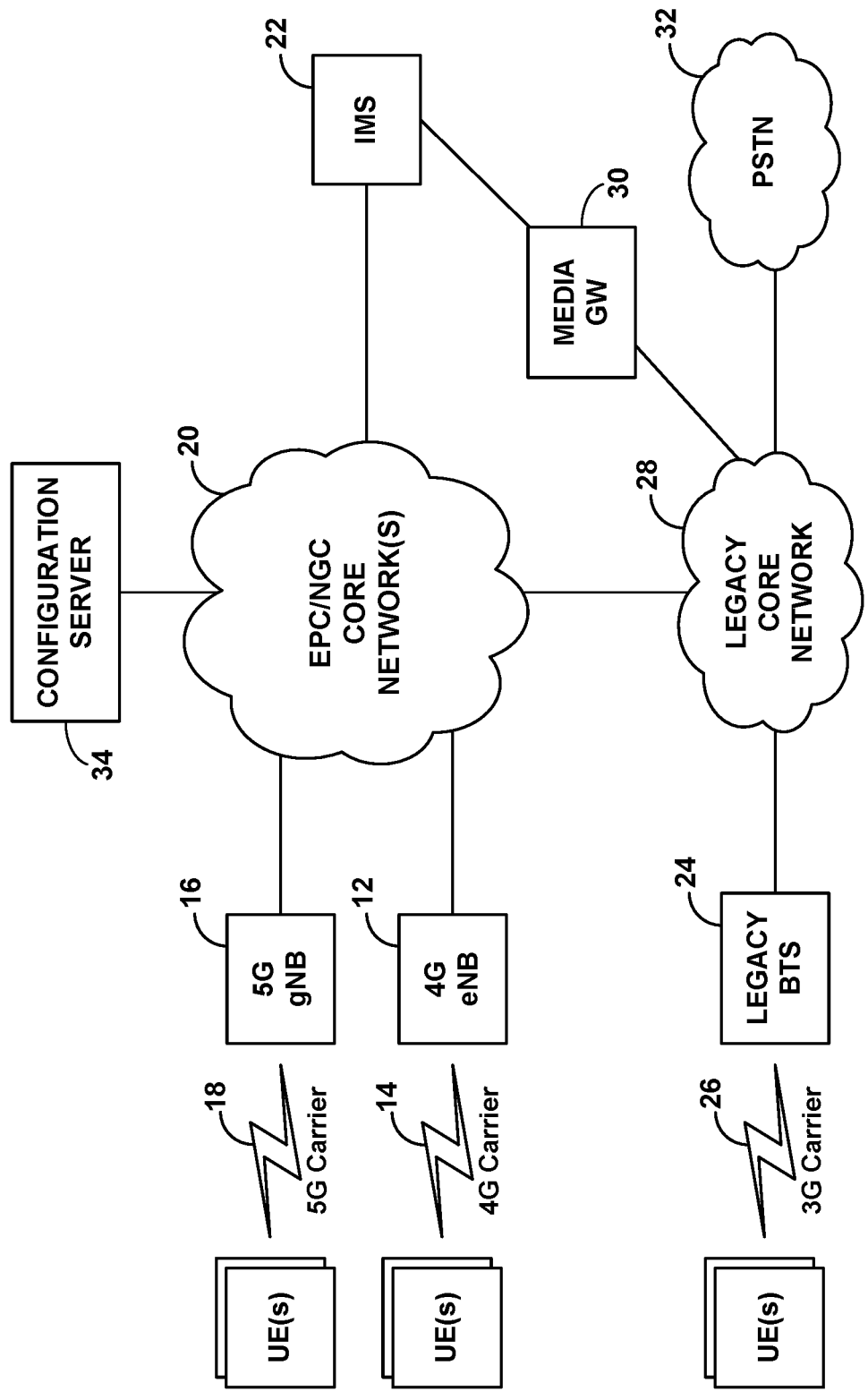
FIG. 1 is a simplified block diagram of an example network arrangement in which aspects of the present disclosure can be implemented.

FIG. 1 is a simplified block diagram of an example network arrangement, showing at its top portion a representative arrangement for providing wireless-packet-data service according to 4G LTE and 5G NR protocols, and showing at its bottom portion a legacy CDMA network for providing wireless circuit-data services such as voice-over-circuit service for instance.

In particular, the top portion of FIG. 1 shows a representative 4G eNB 12 that is configured to provide 4G coverage 14 on a 4G carrier having a designated frequency bandwidth and center frequency, and a representative 5G gNB 16 that is configured to provide 5G coverage 18 on a 5G carrier likewise having a designated frequency bandwidth and center frequency. In the example arrangement, the 4G coverage at least partially geographically overlaps with the 5G coverage, and the 4G carrier at least partially overlaps in frequency with the 5G carrier. Further, each of these base stations is then shown serving one or more UEs on its respective carrier.

In a representative implementation, the 4G coverage and 5G coverage each define a respective air interface divided over time into a continuum of frames, each of which is then divided into subframes, timeslots, and symbol segments, and the 4G carrier and 5G carrier are each divided over frequency into subcarriers. As a result, each base station's coverage defines an array of resource elements in which subcarriers can be modulated to carry data communications. Further, in each subframe, these resource elements could be divided into groups defining physical resource blocks (PRBs) that are allocable by the associated base station (eNB or gNB) on an as-needed basis to carry data communications. And certain resource elements per subframe could be reserved for other purposes.

As further shown, the eNB and gNB are each connected with one or more core networks 20, which could include an Enhanced Packet Core (EPC) network and/or a Next Generation Core (NGC) network, among other possibilities, and which could provide transport-network connectivity. Such a core network could include a gateway system (e.g., a serving gateway (SGW) and packet-data network gateway (PGW) and a control node (e.g., a mobility management entity (MME)).

Also shown accessible on or via a core network 20 is an Internet Multimedia Subsystem (IMS) 22. The IMS supports voice-over-packet service for UEs served by the eNB and gNB. For instance, the IMS may support Session Initiation Protocol (SIP) signaling with served UEs to set up and manage VoIP calls, and the IMS may include a media server to bridge and connect such calls to remote call parties or the like. Thus, a UE served by the eNB or gNB might engage in SIP signaling with the IMS to set up an incoming or outgoing voice-over-packet call, establishing a packet-based real-time media session (e.g., Real-time Transport Protocol (RTP) session) between the UE and IMS, which the IMS could bridge with a remote party, to facilitate voice call communication between the UE and the remote party.

When a UE initially enters into coverage of these base stations, the UE could discover threshold strong coverage of a base station and could responsively work to connect and register for service. In particular, the UE could engage in random-access signaling and Radio Resource Configuration (RRC) signaling with the base station to establish an RRC connection between the UE and the base station. And once so connected, the UE could then engage in attach signaling with a control node of the core network, to register for service with the network 12.

After authenticating the UE, the control node could responsively engage in signaling with the UE's serving base station and the gateway system to coordinate setup for the UE of at least one user-plane bearer defining a packet tunnel extending between the UE and the gateway system, in order to enable the UE to engage in packet-data communication. In a basic arrangement, the control node might initially set up a best-efforts bearer for the UE, to enable the UE to engage in general packet-data communications. Further, the control node may determine from capabilities data that the UE supports voice-over-packet service and may responsively also set up for the UE an IMS signaling bearer for use to carry SIP signaling between the UE and the IMS.

Once the UE is so connected and has one or more established bearers, the UE's serving base station (eNB or gNB) could then provide the UE with packet-data service. For instance, when the base station has data to transmit to the UE, the base station could select PRBs to carry the data and could transmit to the UE a downlink control information (DCI) message specifying the PRBs and could transmit the data to the UE in the specified PRBs. And when the UE has data to transmit to the base station, the UE could transmit a scheduling-request to the base station, the base station could responsively select uplink PRBs to carry the data and could transmit to the UE a downlink control information (DCI) message specifying the PRBs and could transmit the data to the UE in the specified PRBs, and the UE could transmit the data to the base station in the specified PRBs.

For voice-over-packet service, the UE could use such a process to engage in packet-based SIP signaling, via its serving base station, with the IMS 22 to set up a voice-over-packet call. Further, the IMS could respond to that signaling by engaging in control-plane signaling with the core network 20 to invoke setup for the UE of a dedicated voice-over-packet bearer for use to carry packetized voice traffic. And in response, a control node of the core network could engage in signaling with the base station and the gateway system to coordinate setup for the UE of the dedicated bearer. Once the call and dedicated bearer are set up, the UE could then engage in the call, with the base station coordinating use of downlink and uplink PRBs to carry packetized voice traffic to and from the UE.

Turning next to the lower portion of FIG. 1, the example CDMA network is shown including a representative CDMA base station (base transceiver station (BTS)) 24 that is configured to provide 3G coverage 26. Optimally, the 3G coverage at least partially geographically overlaps with the 4G coverage 14 so as to enable UEs that are served by the 4G eNB to engage in voice-interworking as discussed above.

The CDMA coverage could be provided on a 3G carrier, such as a 1.25 MHz carrier, with various dedicated circuits or channels defined on the carrier through spread-spectrum modulation using respective Walsh codes and a pseudo-random noise offset. For instance, the carrier might define a plurality of discrete traffic channels, access channels, paging channels, and the like.

As further shown, the BTS is coupled with a core network 28, which could be separate from or integrated with core network 20. This core network 28 could include various nodes, such as a base station controller (BSC), a mobile switching center (MSC), a home location register (HLR), an interworking function (IWF), and a packet-data serving node (PDSN), among other possibilities. Further, the core network 28 could include or be interconnected with a media gateway 30, possibly instead of the MSC, which could interface between circuit-switched voice communications and associated signaling in the CDMA network and voice-over-packet communications and signaling at the IMS. And the core network 28 could also provide connectivity with the PSTN 32.

When a UE enters into coverage of the BTS, the UE could register for service with the CDMA network by transmitting a registration message over an access channel to the BTS, which the BTS could forward to the MSC. And the MSC could engage in registration-notification signaling with the HLR to record the fact that the UE is being served by the BTS.

When the UE then seeks to place a voice call, the UE could then transmit an origination request message over a CDMA access channel to the BTS, which the BTS could forward to the MSC, and the MSC and/or soft-switch could engage in signaling to set up the call via the IMS. Further, the BTS could assign a dedicated CDMA traffic channel to the UE, to enable the UE to proceed with the call as a voice-over-circuit call. And when the core network 46 seeks to connect an incoming call to the UE, the BTS could page the UE in a paging slot that the UE is arranged to monitor, and upon receipt of a response from the UE, the BTS could likewise assign a dedicated CDMA traffic channel to the UE to enable the UE to proceed with the call as a voice-over-circuit call.

In a representative implementation as discussed above, both the 4G eNB and 5G gNB support providing voice-over-packet service, in that they may be configured to work with a control node to set up dedicated voice-over-packet bearers and they may be configured to support providing quality of service necessary to support voice-over-packet communication over such bearers. In addition, the 4G eNB supports voice-interworking service such as SRLTE or CSFB, and so the 4G eNB could serve a UE with packet-data service while the UE is also served by the 3G BTS for receiving voice-over-circuit service, and the 4G eNB would avoid communications with the UE while the UE is tuned away from 4G to 3G. Whereas, the 5G gNB does not support providing voice-interworking service, and therefore, as to voice service, the 5G gNB is limited to providing voice-over-packet service.

As noted above, the present disclosure provides for giving the 5G gNB higher priority than the 4G for providing voice-over-packet service, on grounds that the 4G eNB supports voice-interworking service but the 5G gNB does not. For instance, when this prioritization is applied, the 5G gNB could be allowed to initiate new voice-over-packet calls but the 4G eNB may not. Or when the 5G gNB initiates a new voice-over-packet call, the 4G eNB may responsively transition one or more of the 4G eNB's served UEs into a voice-interworking mode such as SRLTE or CSFB and/or may transfer one or more existing voice calls from 4G (as voice-over-packet calls) to 3G (as voice-over-circuit calls). Other examples are possible as well.

Either or each of the 4G and 5G base stations 12, 16 could be programmed with logic that causes the base stations implement this voice-call prioritization. For instance, the 4G eNB could be programmed to operate as a master controller of this process, and the 5G gNB could be programmed to regularly report to the 4G eNB the 5G gNB's level of load of communication traffic and to report to the 4G eNB whenever the 5G gNB receives a request (e.g., from an MME) to set up a dedicated voice-over-packet bearer for a UE. Based on an evaluation of its own load and the 5G gNB's load, the 4G eNB could then determine whether and when the base stations should operate with the voice-call prioritization. Here, the loading could be a measure of either or both base station's usage of its PRB capacity or other resource usage per unit time or the like or could take other forms.

And when operating with the voice-call prioritization, if the 4G eNB encounters a situation when it and the 5G gNB have each received a respective request to set up a dedicated voice-over-packet bearer, the 4G eNB could then responsively decline the request that it received while the 5G eNB accepts the request that it received. Further, in that situation, the 4G eNB could also responsively then instruct its served UE (for which the dedicated bearer would have been set up) to transition to voice-interworking mode. And the UE could thus responsively register with the CDMA network directly or via the 4G network to facilitate then operating in SRLTE or CSFB mode for instance.

Alternatively or additionally, when operating with the voice-call prioritization, if the 4G eNB is serving a UE with a voice-over-packet call and receives from the 5G gNB a report that the 5G gNB is setting up a dedicated bearer for a 5G voice-over-packet call, the 4G eNB could responsively transfer its currently served voice call from being a 4G voice-over-packet call to being a CDMA voice-over-circuit call. For instance, the 4G eNB could engage Single Radio Voice Call Continuity (SRVCC) signaling with the IMS 22 and with the UE, to cause the UE to transition from 4G service to 3G service and to continue the UE's voice call via CDMA. Further, here too, the 4G eNB may direct the UE to operate in SRLTE mode.

As further noted above, either or each of the 4G and 5G base stations 12, 16 could be so programmed at the time either or each base station is added to the network. For example, if a cell site includes the 4G eNB and the 3G BTS and the cellular provider adds a 5G gNB to the cell site, the addition of the 5G gNB could trigger programming of the 5G gNB and/or 4G eNB to implement the voice-call prioritization.

For instance, when the 5G gNB is added to the cell site, a network engineer could determine from configuration data that the 5G gNB and 4G eNB provide at least partially geographically-overlapping coverage on at least partially frequency-overlapping carriers. And the engineer could further determine from base station capabilities data or spec sheets, or by reference to standards data or the like, that the 4G eNB supports providing voice-interworking service but that the 5G gNB does not support providing voice-interworking service. In response, the engineer could then program the 4G eNB and 5G gNB to implement the voice-call prioritization as discussed above.

Alternatively, this could be a more automated, dynamic process. For instance, the wireless communication system could additionally include a configuration server 34, such as a SON server (alternatively integrated in one or both of the base stations or provided elsewhere), which could orchestrate configuration of either or both base stations to facilitate the voice-call prioritization.

Using SON techniques, the server 34 could receive from 5G gNB a signaling message when the 5G gNB is connected to the network. From this signaling message or through further signaling between the server and the 5G gNB, the server could learn or establish configuration information of the 5G gNB such as coverage scope and RF carrier scope. And the server could further consult configuration data to determine similar information for the 4G eNB of the same cell site, and could thereby determine that the 5G gNB and 4G eNB will provide at least partially geographically-overlapping coverage on at least partially frequency-overlapping carriers. In addition, through lookups and/or other signaling or logic, the server could determine that the 4G eNB supports voice-interworking service but that the 5G gNB does not support voice-interworking service.

Based on this analysis, the server could thus determine that the 4G eNB and 5G gNB should operate with the voice-call prioritization as discussed above, and particularly that the 5G gNB should be given priority over the 4G eNB for providing voice-over-packet service, perhaps specifically when the base stations are heavily loaded. And in response to this determination, the server could then transmit to the 4G eNB and 5G gNB program logic for storage and execution by the base stations to cause them to operate with the voice-call prioritization.

Figure 2:
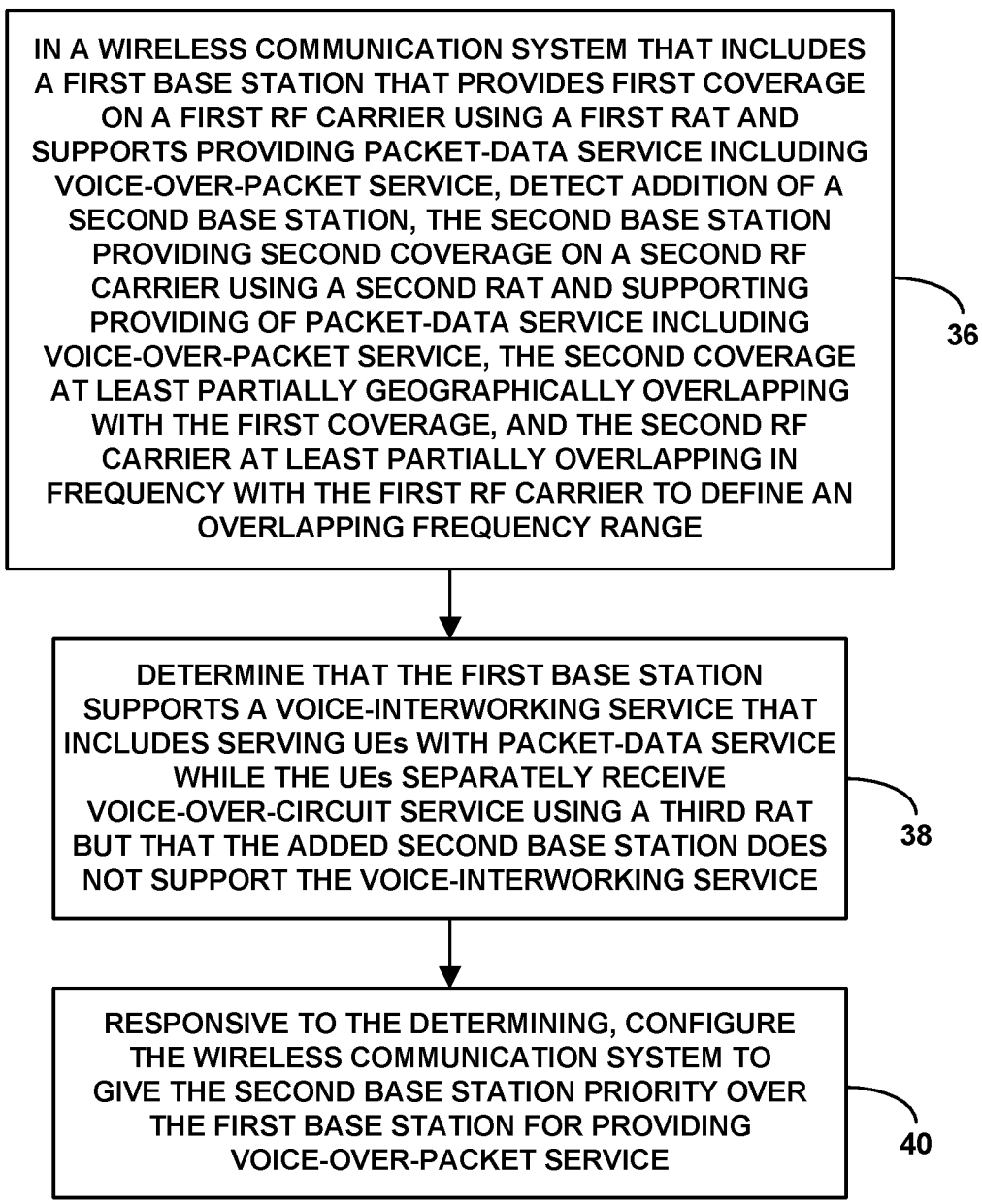
FIG. 2 is a flow chart depicting an example method in accordance with the disclosure.

FIG. 2 is a flow chart depicting a method that could be carried out in accordance with the discussion above, to control voice service in a wireless communication system that includes a first base station that provides first coverage on a first RF carrier using a first RAT and supports providing packet-data service including voice-over-packet service.

As shown in FIG. 2, at block 36, the method includes detecting addition to the wireless communication system of a second base station, the second base station providing second coverage on a second RF carrier using a second RAT and also supporting providing of packet-data service including voice-over-packet service, the second coverage at least partially geographically overlapping with the first coverage, and the second RF carrier at least partially overlapping in frequency with the first RF carrier to define an overlapping frequency range. Further, at block 38, the method includes determining (i) that the first base station supports a voice-interworking service that includes serving UEs with packet-data service while the UEs separately receive voice-over-circuit service using a third RAT but (ii) that the added second base station does not support the voice-interworking service. And at block 40, the method includes, responsive to the determining, configuring the wireless communication system to give the second base station priority over the first base station for providing voice-over-packet service.

As discussed above, this method could be carried out by a configuration server such as a SON server or the like. For instance, the configuration server could detect the addition of the second base station by receiving signaling from the second base station when the second base station is brought online and/or from engineering input. And the configuration server could determine that the first base station supports voice-interworking service but that the second base station does not support voice-interworking service by referring to stored base station capabilities data, possibly keyed to base station model or the like, and/or through signaling with the base stations or through other means.

The configuration server could then give the second base station priority over the first base station for providing voice-over-packet service by transmitting to either or each base station a set of programming logic that will be stored and executed by the base station(s) to cause the base station(s) to implement the prioritization, and/or by otherwise configuring the first base station and/or second base station to implement the prioritization.

In line with the discussion above, the act of configuring the wireless communication system to give the second base station priority over the first base station for providing voice-over-packet service could involve configuring the first base station and/or the second base station to carry out operations including (i) detecting when the first base station and second base station have threshold heavy loading of communication traffic and (ii) responsive to detecting when the first base station and second base station have threshold heavy loading of communication traffic, configuring at least one of the first base station and the second base station to give the second base station priority over the first base station for providing voice-over-packet service.

Further, the act of giving the second base station priority over the first base station for providing voice-over-packet service could involve programming at least one of the first base station and second base station to carry out operations including (i) detecting when the first base station receives a first request to set up a first voice call as a voice-over-packet call on the first RF carrier and the second base station receives a second request to set up a second voice call as a voice-over-packet call on the second RF carrier and (ii) responsive to detecting when the first base station receives a first request to set up a first voice call as a voice-over-packet call on the first RF carrier and the second base station receives a second request to set up a second voice call as a voice-over-packet call on the second RF carrier, causing the first base station to deny the first request while the second base station grants the second request.

For instance, the first request could be from a first UE, in which case the operations could further include, responsive to detecting when the first base station receives a first request to set up a first voice call as a voice-over-packet call on the first RF carrier and the second base station receives a second request to set up a second voice call as a voice-over-packet call on the second RF carrier, causing the first base station to redirect the first UE to use the voice-interworking service. By way of example, the first base statin could transmit an RRC signaling message to the first UE that directs the first UE to start operating in SRLTE mode, and the first UE could responsively then operate in SRLTE mode.

Still further, the act of giving the second base station priority over the first base station for providing voice-over-packet service comprises programming at least one of the first base station and second base station to carry out operations including (i) detecting when the second base station receives a request to set up a voice call as a voice-over-packet call on the second RF carrier and (ii) responsive to detecting when the second base station receives a request to set up a voice call as a voice-overpacket call on the second RF carrier, causing the second base station to grant the request while causing the first base station to transfer an existing voice call from being a voice-over-packet call on the first RF carrier to being a voice-over-circuit call using the third RAT.

As further discussed above, the act of so configuring the wireless communication system could be further responsive to determining that the first coverage at least partially geographically overlaps with the second coverage and that the first RF carrier at least partially overlaps in frequency with the second RF carrier.

Figure 3:
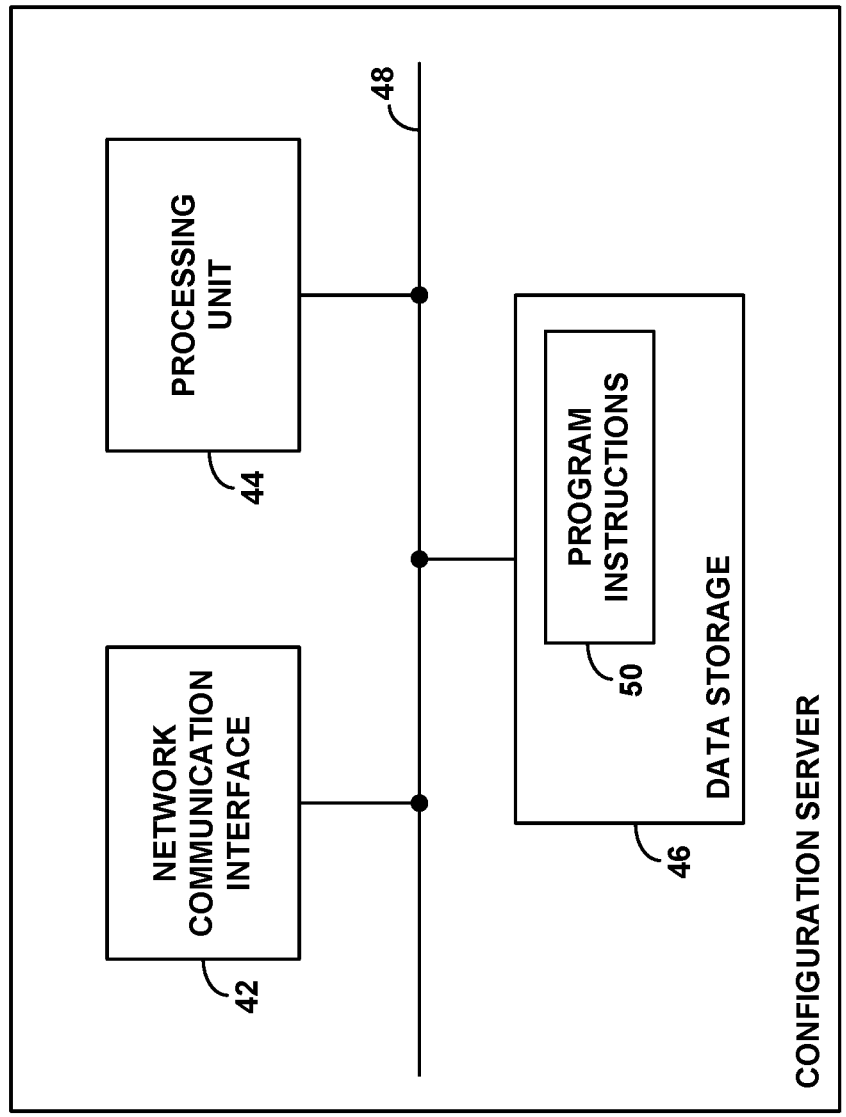
FIG. 3 is a simplified block diagram of a configuration server operable in accordance with the disclosure.

FIG. 3 is next a simplified block diagram of an example configuration server operable in accordance with the present disclosure, to control voice service in a wireless communication system as discussed above. As shown in FIG. 3, the example configuration server includes a network communication interface 42, a processing unit 44, and non-transitory data storage 46, all of which could be integrated and/or communicatively linked by a system bus, network, or other connection mechanism 48.

Network communication interface 42 could comprise may comprise a wired or wireless interface, such as an Ethernet network communication interface, configured to support communication with other entities, such as with various core network entities and base stations for instance. Processing unit 44 could comprise one or more processors (e.g., general purpose microprocessors and/or specialized processors). And data storage 46 could comprise one or more volatile and/or non-volatile storage components, such magnetic, optical, or flash storage and could store program instructions 50 that are executable by the processing unit 44 to carry out various configuration-server operations such as those described above.

Finally, FIG. 4 is another flow chart depicting a method that could be carried out in accordance with the present disclosure, to control voice service in a system that includes a first base station that provides first coverage on a first RF carrier and a second base station that provides second coverage on a second RF carrier, the first and second RF carriers at least partially overlapping with each other in frequency to define an overlapping frequency region, and the first coverage at least partially geographically overlapping with the second coverage, and the first and second base stations each supporting providing of voice-over-packet service.

As shown in FIG. 4, at block 52, the method includes determining (i) that the first base station and second base station have threshold heaving loading and (ii) that the first base station supports providing voice-interworking service including providing wireless packet-data service to UEs while the UEs separately receive voice-over-circuit service, but that the second base station does not support providing the voice-interworking service. And at block 54, the method includes, responsive to the determining, configuring the first and second base stations to give the second base station priority over the first base station for use of the overlapping frequency region to provide the voice-over-packet service.

As discussed above, this method could be carried out by one or both of the base stations. For instance, either or each base station could be configured with data specifying whether it supports voice-interworking service and whether the other base station supports voice-interworking service. Further, the base stations could share information about their respective load, to facilitate determining whether either or each base station has threshold heavy loading. And either or each base station could be configured with program logic to use this information as a basis to give the second base station priority over the first base station for use of at least the overlapping frequency region to provide voice-over-packet service.

Exemplary embodiments have been described above. Those skilled in the art will understand, however, that changes and modifications may be made to these embodiments without departing from the true scope and spirit of the invention.

We claim:

1. A method for controlling voice service in a wireless communication system, wherein the wireless communication system includes a first base station that provides first coverage on a first RF carrier using a first radio access technology (RAT) and supports providing packet-data service including voice-over-packet service, the method comprising:

detecting addition to the wireless communication system of a second base station, wherein the second base station provides second coverage on a second RF carrier using a second RAT and that also supports providing packet-data service including voice-over-packet service, wherein the second coverage at least partially geographically overlaps with the first coverage and wherein the second RF carrier at least partially overlaps in frequency with the first RF carrier to define an overlapping frequency range;

determining (i) that the first base station supports a voice-interworking service that includes serving UEs with packet-data service while the UEs separately receive voice-over-circuit service using a third RAT but (ii) that the added second base station does not support the voice-interworking service; and responsive to the determining, configuring the wireless communication system to give the second base station priority over the first base station for providing voice-over-packet service.

2. The method of claim 1, carried out by a configuration server.

3. The method of claim 2, wherein configuring the wireless communication system to give the second base station priority over the first base station for providing voice-over-packet service comprises configuring at least one of the first base station and the second base station to carry out operations including:

detecting when the first base station and second base station have threshold heavy loading of communication traffic; and responsive to detecting when the first base station and second base station have threshold heavy loading of communication traffic, configuring at least one of the first base station and the second base station to give the second base station priority over the first base station for providing voice-over-packet service.

4. The method of claim 2, wherein giving the second base station priority over the first base station for providing voice-over-packet service comprises programming at least one of the first base station and second base station to carry out operations including:

detecting when the first base station receives a first request to set up a first voice call as a voice-over-packet call on the first RF carrier and the second base station receives a second request to set up a second voice call as a voice-over-packet call on the second RF carrier; and responsive to detecting when the first base station receives a first request to set up a first voice call as a voice-over-packet call on the first RF carrier and the second base station receives a second request to set up a second voice call as a voice-over-packet call on the second RF carrier, causing the first base station to deny the first request while the second base station grants the second request.

5. The method of claim 4, wherein the first request is from a first UE, and wherein the operations further include:
responsive to detecting when the first base station receives a first request to set up a first voice call as a voice-over-packet call on the first RF carrier and the second base station receives a second request to set up a second voice call as a voice-over-packet call on the second RF carrier, causing the first base station to redirect the first UE to use the voice-interworking service.

6. The method of claim 2, wherein giving the second base station priority over the first base station for providing voice-over-packet service comprises programming at least one of the first base station and second base station to carry out operations including:
detecting when the second base station receives a request to set up a voice call as a voice-over-packet call on the second RF carrier; and
responsive to detecting when the second base station receives a request to set up a voice call as a voice-over-packet call on the second RF carrier, causing the second base station to grant the request while causing the first base station to transfer an existing voice call from being a voice-over-packet call on the first RF carrier to being a voice-over-circuit call using the third RAT.

7. The method of claim 2, wherein the detecting of the addition of the second base station comprises receiving signaling that indicates the addition of the second base station.

8. The method of claim 2, wherein the determining comprises referring to data that indicates that the first base station supports the voice-interworking service but that the second base station does not support the voice-interworking service.

9. The method of claim 2, wherein the configuring is further responsive to determining that the first coverage at least partially geographically overlaps with the second coverage and that the first RF carrier at least partially overlaps in frequency with the second RF carrier.

10. The method of claim 2, wherein the first RAT is LTE, wherein the second RAT is 5GNR, and wherein the third RAT is CDMA.

11. A configuration server operable to control voice service in a wireless communication system, wherein the wireless communication system includes a first base station that provides first coverage on a first RF carrier using a first radio access technology (RAT) and supports providing packet-data service including voice-over-packet service, the configuration server comprising:
a network communication interface;
a processing unit;
non-transitory data storage; and
program instructions stored in the non-transitory data storage and executable by the processing unit to carry out operations including:
detecting addition to the wireless communication system of a second base station, wherein the second base station provides second coverage on a second RF carrier using a second RAT and that also supports providing packet-data service including voice-over-packet service, wherein the second coverage at least partially geographically overlaps with the first coverage and wherein the second RF carrier at least partially overlaps in frequency with the first RF carrier to define an overlapping frequency range,
determining (i) that the first base station supports a voice-interworking service that includes serving UEs with packet-data service while the UEs separately receive voice-over-circuit service using a third RAT but (ii) that the added second base station does not support the voice-interworking service, and
responsive to the determining, configuring the wireless communication system to give the second base station priority over the first base station for providing voice-over-packet service.

12. The configuration server of claim 11, wherein configuring the wireless communication system to give the second base station priority over the first base station for providing voice-over-packet service comprises configuring at least one of the first base station and the second base station to carry out a process including:
detecting when the first base station and second base station have threshold heavy loading of communication traffic; and
responsive to detecting when the first base station and second base station have threshold heavy loading of communication traffic, configuring at least one of the first base station and the second base station to give the second base station priority over the first base station for providing voice-over-packet service.

13. The configuration server of claim 11, wherein giving the second base station priority over the first base station for providing voice-over-packet service comprises programming at least one of the first base station and second base station to carry out a process including:
detecting when the first base station receives a first request to set up a first voice call as a voice-over-packet call on the first RF carrier and the second base station receives a second request to set up a second voice call as a voice-over-packet call on the second RF carrier; and
responsive to detecting when the first base station receives a first request to set up a first voice call as a voice-over-packet call on the first RF carrier and the second base station receives a second request to set up a second voice call as a voice-over-packet call on the second RF carrier, causing the first base station to deny the first request while the second base station grants the second request.

14. The configuration server of claim 13, wherein the first request is from a first UE, and wherein the process further includes:
responsive to detecting when the first base station receives a first request to set up a first voice call as a voice-over-packet call on the first RF carrier and the second base station receives a second request to set up a second voice call as a voice-over-packet call on the second RF carrier, causing the first base station to redirect the first UE to use the voice-interworking service.

15. The configuration server of claim 11, wherein giving the second base station priority over the first base station for providing voice-over-packet service comprises programming at least one of the first base station and second base station to carry out a process including:
detecting when the second base station receives a request to set up a voice call as a voice-over-packet call on the second RF carrier; and
responsive to detecting when the second base station receives a request to set up a voice call as a voiceover-packet call on the second RF carrier, causing the second base station to grant the request while causing the first base station to transfer an existing voice call from being a voice-over-packet call on the first RF carrier to being a voice-over-circuit call using the third RAT.

16. The configuration server of claim 11, wherein the detecting of the addition of the second base station comprises receiving signaling that indicates the addition of the second base station.

17. The configuration server of claim 11, wherein the determining comprises referring to data that indicates that the first base station supports the voice-interworking service but that the second base station does not support the voice-interworking service.

18. The configuration server of claim 11, wherein the configuring is further responsive to determining that the first coverage at least partially geographically overlaps with the second coverage and that the first RF carrier at least partially overlaps in frequency with the second RF carrier.

19. The configuration server of claim 11, wherein the first RAT is LTE, wherein the second RAT is 5GNR, and wherein the third RAT is CDMA.

20. A method for controlling voice service in a system comprising a first base station that provides first coverage on a first radio-frequency (RF) carrier and a second base station that provides second coverage on a second RF carrier, the first and second RF carriers at least partially overlapping with each other in frequency to define an overlapping frequency region, and the first coverage at least partially geographically overlapping with the second coverage, wherein the first and second base stations each support providing voice-over-packet service, the method comprising:

determining (i) that the first base station and second base station have threshold heaving loading and (ii) that the first base station supports providing voice-interworking service including providing wireless packet-data service to UEs while the UEs separately receive voice-over-circuit service, but that the second base station does not support providing the voice-interworking service; and responsive to the determining, configuring the first and second base stations to give the second base station priority over the first base station for use of the overlapping frequency region to provide the voice-over-packet service.

\* \* \* \* \*